Figure 1:
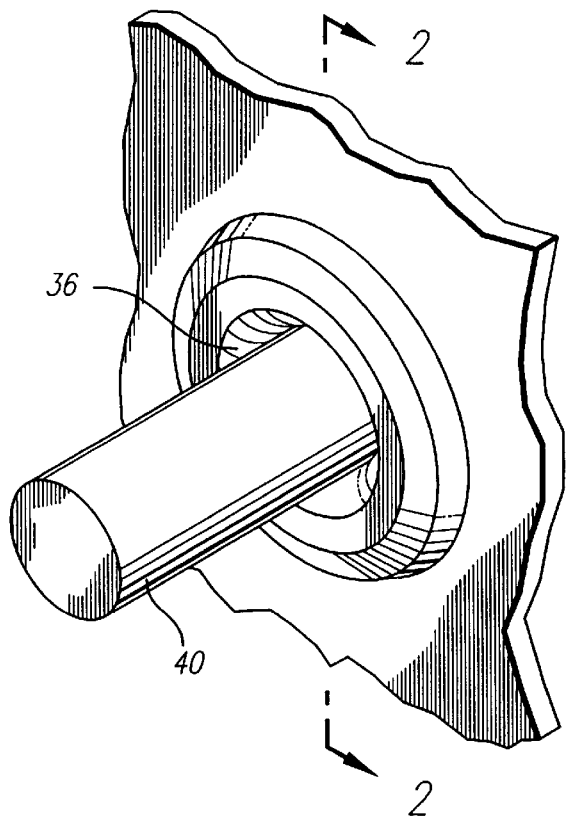

United States Patent [19]
Fisher et al.

[11] Patent Number: 6,051,795
[45] Date of Patent: Apr. 18, 2000

[54] GIMBALLED GROMMET HAVING SECTIONS WITH DIFFERENT MELT TEMPERATURES

[75] Inventors: Bruce S. Fisher, Burbank; Ronald A. Jackson, Glendora; Kevin D. Loveall, Pasadena, all of Calif.

[73] Assignee: TA Mfg. Company, Glendale, Calif.

[21] Appl. No.: 08/880,023

[22] Filed: Jun. 20, 1997

Related U.S. Application Data

[63] Continuation of application No. 08/518,254, Aug. 22, 1995, abandoned.

[51] Int. Cl.[7] .................................................. H01B 17/26
[52] U.S. Cl. ........................................ 174/153 G; 16/2.1
[58] Field of Search .......................... 174/153 G, 153 R, 174/152 G, 152 R, 65 G, 151, 157, 65 SS; 16/2.1; 106/18.12, 18.11

[56] References Cited

U.S. PATENT DOCUMENTS

| | | | |
|---|---|---|---|
| 2,039,009 | 4/1936 | Lapman et al. | 285/159 |
| 2,367,836 | 1/1945 | Brown | 16/2 |
| 4,961,989 | 10/1990 | Grimwood | 428/229 |
| 5,071,143 | 12/1991 | Byerly et al. | 277/178 |

*Primary Examiner*—Kristine Kincaid
*Assistant Examiner*—Kamand Cuneo
*Attorney, Agent, or Firm*—Ellsworth R. Roston; Fulwider Patton Lee & Utecht, LLP

[57] ABSTRACT

A grommet disposed in a panel hole to prevent a fire from spreading from one panel side to the other has a pair of flaps defining a socket for nesting in the panel hole in a closely fit relationship. Preferably one flap is longer than the other and is disposed against the panel surface. The grommet has an inner peripheral surface, preferably annular, defining a hollow central opening with a radius less than that of the cable so as to receive and retain the cable even with changes in cable positioning. The grommet has a fire resistant chemical composition which becomes resiliently flattened upon the cable disposition in the grommet opening. One flap is bent toward the other with the panel withdrawn from the socket and is resiliently pressed against the panel with the panel in the socket. The grommet includes, in the section with the larger flap, a fire resistant fabric (e.g. ceramic) impregnated and coated with the fire resistant chemical composition (e.g. silicone with an approximately 55 Rockwell hardness). The chemical composition of the grommet in the section with the larger flap preferably has a higher melting temperature than the chemical composition of the other section.

33 Claims, 2 Drawing Sheets

GIMBALLED GROMMET HAVING SECTIONS WITH DIFFERENT MELT TEMPERATURES

This is a Continuation of application Ser. No. 08/518,254, filed Aug. 22, 1995, now abandoned.

This invention relates to grommets and more particularly relates to grommets for preventing a fire on one side of a panel from spreading to the other side of the panel.

Panels are provided in airplanes for separating one compartment from another. Holes are provided in the panels for providing for the passage of cables through the holes from the one compartment to the other. The cables may illustratively pass electrical signals from strategic terminals in the one compartment to strategic terminals in the other compartment.

Grommets have been nested in the holes in the panels in the prior art to secure the cables at the positions of the panels and prevent the cables from rubbing against the panels. As will be appreciated, the cables might otherwise chafe against the holes defining the holes in the panels. Such chafing could expose the wires in the cables and result in short circuits and produce fires.

The grommets now in use have had certain difficulties. They have not been completely effective in sealing one compartment from another to prevent a fire from spreading. They have also not been effective in gimballing the cable so that the cable is able to change position while still being fixedly retained within central openings in the grommets. These problems have existed for decades without any full resolution even though a substantial amount of effort has been devoted, and significant amounts of money have been expended, to resolve such problems.

This invention provides grommets which significantly overcome the above difficulties. The grommet of this invention provides a significant advance over grommets of the prior art in preventing the spread of fire from one compartment to an adjacent compartment. The grommets of this invention also provide an effective gimballing relative to the cables extending through the grommets so that the cables can alter their directional dispositions while being fixedly retained by the grommets.

In one embodiment of the invention, a grommet disposed in a hole in a panel to prevent a fire from spreading from one panel side to the other has a pair of flaps defining a socket for nesting in the panel hole in a closely fit relationship. Preferably one flap is longer than the other and is disposed against the panel surface more critical from a fire standpoint than the other surface.

The grommet has an inner peripheral surface, preferably annular, defining a hollow central opening with a radius less than that of the cable so as to receive and retain the cable even with changes in cable positioning. The grommet has a resilient fire resistant chemical composition which becomes resiliently flattened upon the cable disposition in the grommet opening.

One flap is bent toward the other with the panel withdrawn from the socket and is resiliently pressed against the panel with the panel in the socket. The grommet includes, in the section with the larger flap, a fire resistant fabric (e.g. ceramic) impregnated and coated with the fire resistant chemical composition (e.g. silicone with a Rockwell hardness of approximately 55). The chemical composition of the grommet in the one section preferably has a higher melting temperature than the chemical composition of the other section.

Figure 2:
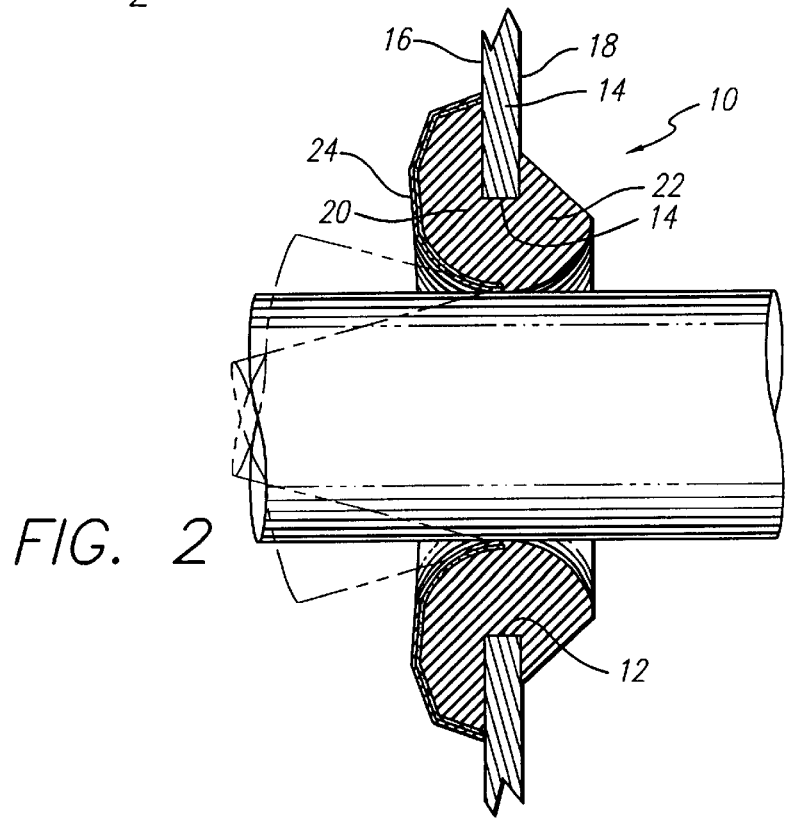
Figure 3:
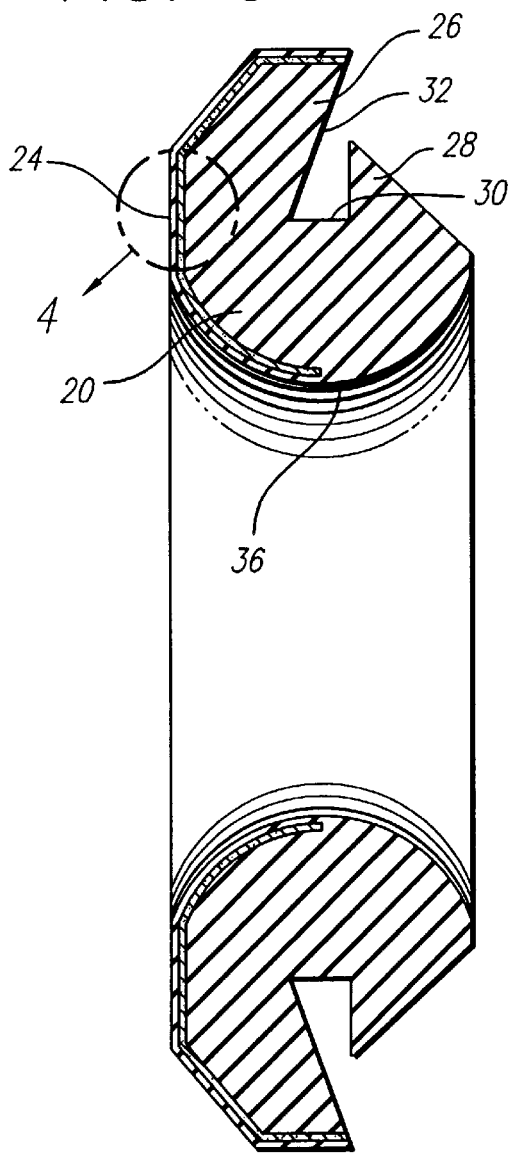
Figure 4:
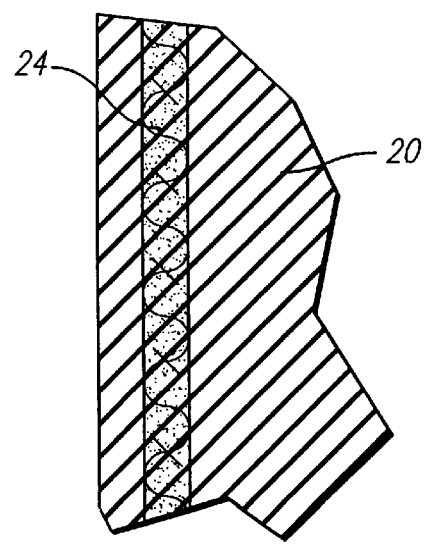

In the drawings:

FIG. 1 is a fragmentary perspective view of a panel separating two (2) compartments and of a grommet nesting in a hole in the panel, the grommet constituting one embodiment of the invention;

FIG. 2 is a sectional view taken substantially on the line 2—2 of FIG. 1 and illustrates in additional detail the construction of the grommet and the disposition of the grommet relative to a panel receiving the grommet and also illustrates a cable extending through a hole in the grommet and the ability of the grommet to adjust with changes in the direction of the disposition of the cable in the hole in the grommet;

FIG. 3 is a sectional view similar to that shown in FIG. 2 and illustrates the cross-sectional shape of the grommet before the panel receives the grommet; and FIG. 4 is an enlarged fragmentary sectional view of the portion of the grommet within the broken circle indicated at 4 in FIG. 3.

In one embodiment of the invention, a grommet generally indicated at 10 is shown in FIGS. 1–4. The grommet is adapted to be disposed in a hole 12 in a panel 14 to prevent fire on one side such as the side 16 of the panel from spreading to the other side such as the side 18 of the panel. The panel 14 may be disposed in an airplane to separate the airplane into different compartments or bulkheads.

The grommet 10 may include a section 20 preferably having an annular configuration and integral with a section 22 also preferably having an annular configuration. Each of the sections 20 and 22 may be formed from a silicone material having properties of withstanding heat at elevated temperatures. Preferably the silicone of the section 20 has a higher melting temperature than the silicone of the section 22. The formulation of silicones with these properties is well known in the art. A material such as a silicone has resilient properties. The separate sections 20 and 22 are indicated schematically in FIG. 3 and are defined by broken lines 25.

The section 20 preferably has a larger configuration than the section 22. A fabric 24 is disposed in the section 20 at a position near the periphery of the section 20. The fabric 24 is preferably configured to follow the peripheral contour of the section 20 of the grommet. The fabric 24 may be made from a suitable heat insulating material such as a ceramic. Preferably the melting temperature of the fabric 24 is greater than the melting temperatures of the silicones in the sections 20 and 22. The fabric 24 is disposed such that the silicone in the section 20 impregnates and covers the fabric.

The grommet 10 may include a pair of flaps 26 and 28 disposed relative to each other to define a socket 30. The flap 26 is provided on the section 20 and the flap 28 is provided on the section 22. The flap 26 on the section 20 may extend a greater distance from the base of the socket 30 than the flap 28 on the section 22. Preferably the flap 26 has a bevelled surface 32 facing the flap 28 so that the width of the socket 30 progressively decreases with increasing distances from the base of the socket 30.

The grommet 10 is disposed so that the portion of the panel defining the periphery of the hole 12 in the panel 14 is disposed in the socket 30. In order for the socket 30 to receive the portion of the panel 14 defining the hole 12, the flap 26 is bent away from the flap 28. In this way, the flap 26 engages the panel 14 at every position around the periphery of the hole 12.

The grommet 10 is provided with a hole 36 at its inner periphery to receive and fixedly hold a member such as a cable 40 (FIG. 2). In this way, the cable 40 is able to extend through the hole 12 in the panel 14 without contacting the panel. Furthermore, the cable 40 is protected by the grommet 10 from any fire in or near the panel. The hole 36 is defined by an inner peripheral surface in the grommet 10 and is preferably provided with an annular configuration having a radius smaller than the radius of the cable 40. Preferably the portion of the hole 36 adjacent the section 20 has a smaller diameter than the portion of the hole adjacent the section 22. The grommet 10 may be considered to have an outer peripheral surface in the portions of the grommet displaced from the inner peripheral surface.

Because of the resilient properties of the silicone material in the sections 20 and 22, the inner peripheral surface defining of the hole 36 in the grommet is able to become flattened against the cable 40 when the cable is extended through the hole. This enhances the fixed disposition of the cable 40 within the grommet 10. Furthermore, the cable 40 is able to shift from a concentric relationship with the hole 36 (as indicated in solid lines in FIG. 2) to a non-concentric relationship with the hole 36 (as indicated in broken lines in FIG. 2) without affecting the fixed disposition of the cable 40 in the hole 36.

The grommet shown in FIGS. 1–6 and described above has certain important advantages. It holds the cable 40 firmly within the hole 36 even when the cable is shifted from a concentric relationship to a non-concentric relationship as shown in FIG. 2. Furthermore, the grommet 10 retains the panel 14 in a close fit and a sealed relationship in the socket 30 because of the resilient characteristics of the flap 26. In this way, the grommet 10 prevents the cable 40 from becoming frayed, particularly when the cable shifts position as shown in FIG. 2.

The grommet 10 also has optimal fire resistant properties in preventing a fire on the side 16 of the panel from spreading to the side 18 of the panel. This results in part from the larger length of the flap 26 than the length of the flap 28. The larger length of the flap 26 is provided because there is a greater tendency for a fire on the side 16 of the panel 14 than on the side 18 of the panel. It also results in part from the properties of the fabric 24 in withstanding heat. It also results in part from the increased ability of the silicone in the section 20, relative to the ability of the silicone in the section 22, to withstand heat. It also results in part from the resilient characteristics of the flap 26 and the sealed disposition of the flap relative to the surface 16 of the panel. These resilient characteristics cause the disposition of the flap 26 to conform to the disposition of the panel 14.

The chemical composition of the section 20 in the embodiment shown in FIGS. 1–6 may be as follows:

| Components | Units By weight in Composition of Section 20 |
|---|---|
| Dow Corning Silastic HS-50 | 75 |
| Dow Corning Silastic LS-50 | 25 |
| Dow Corning Silastic FR-1 | 20 |
| Varox DBPH-50 (catalyst) | 0.72 |

The weight of each of the different components in the gasket 20 may be varied by as much as approximately plus or minus five percent (±5%) without departing from the scope of the invention.

The Silastic HS-50 material is a methyl vinyl polysiloxane compound having high tensile and tear strength and a hardness providing for a durometer "A" of about fifty five (55) for the gasket 20. The Silastic LS-50 material is a methyl phenyl polysiloxane. It is desirable because it remains flexible at low temperatures such as are encountered by an airplane on or near the ground or in the upper atmosphere. Such compounds still exhibit good flexibility and resilience at temperatures as low as −65° F. such as occur in unheated portions of an aircraft during flying. The Silastic FR-1 material is added for fire resistance. It is a dispersion of various ingredients, including platinum, in a polysiloxane. The catalyst is Varox DBPH-50, which is sold by the Los Angeles sales office of R. T. Vanderbilt. The catalyst provides for the curing of the mixture of the components included in the gasket 20.

The gasket 20 may be press cured at a pressure of approximately 2000 psi and at a temperature of approximately 340° F. for a period of about 12 minutes. Then it is oven post-cured at a temperature of approximately 450° F. for a period of approximately eight (8) hours without any pressure being applied to the material.

The section 22 may be formulated from the materials specified for the material 20. However, the percentages of such materials may be varied depending upon the heat resistant characteristics desired for the material 22 relative to the heat resistant characteristics of the section 20. It is believed that a person of ordinary skill in the art will know, or can easily determine, the variations to be made in the relative percentages of the different materials to obtain the desired heat resistant characteristics of the section 22. Of course, when the section 22 is to have the same heat resistant characteristics as the section 22, the section 22 will have the same composition as the section 20.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

We claim:

1. A grommet for disposition in a hole in a panel and for reception of a cable having a radius, including, a member formed from a tire resistant material, the member being shaped to provide a pair of flaps defining a socket for receiving the panel in a particular relationship, the member having at its inner end an inner peripheral surface defining a hollow opening for receiving the cable, the inner peripheral surface having an annular surface with a radius less than the radius of the cable and with resilient properties to provide for a flattening of the member upon the disposition of the cable in the hollow opening in the member, the member having an outer peripheral surface continuous with the inner peripheral surface, the member having a chemical composition providing a fire resistant material, and a fabric disposed in the member near the outer and inner peripheral surfaces of the member and having heat resistant properties, the fabric being impregnated and covered with the fire resistant material, the fabric being disposed near the inner and outer peripheral surfaces along a portion of the member and wherein one of the flaps is constructed to engage a first surface of the panel and wherein the member is made from a resilient material and wherein the one of the flaps extends inwardly toward the other one of the flaps, in a free disposition of the flaps, for engaging the panel and wherein the flaps have an open end and wherein the chemical composition of the member constitutes a silicone with a Rockwell hardness of substantially 55 and wherein the member has first and second portions on opposite sides of the panel, the first portion of the member for being on one side of the panel and including the one of the flaps and the second portion of the member for being on the other side of the panel and including the other one of the flaps and wherein the first portion of the member has a higher melting temperature than the second portion of the member.

2. A grommet as set forth in claim 1 wherein the fabric is made from a ceramic having a higher melting temperature than the melting temperatures of the first and second portions of the member.

3. A grommet as set forth in claim 1 wherein the fabric is impregnated and covered by the member and wherein the fabric is a ceramic having a higher melting temperature than the melting temperatures of the first and second portions of the member and wherein the contour of the fabric conforms substantially to the contour of the outer peripheral surface and the inner peripheral surface of the first portion of the member.

4. A grommet for disposition in a hole in a panel having first and second sides and for reception of a cable having a radius including, a member having inner and outer ends and having a central opening at its inner end to receive the cable in a pressed fit and having at its outer end a pair of spaced flaps defining a socket for receiving the panel and having a curved configuration at its central opening with a radius less than the radius of the cable to provide for a flattening of the member at the central opening against the exterior surface of the cable and having a chemical composition retarding the spread of any fire, one of the flaps being on one side of the socket and the other one of the flaps being on the other side of the socket, and a fabric disposed in the member on the one side of the socket near the surface of the member and having a composition resisting any fire and impregnated and covered by the member on the one side of the socket, the fabric extending from the one of the flaps to the central opening in the member, wherein the fabric is disposed near the surface of the member on the one side of the socket and is made from a ceramic and wherein the fabric and the member have melting temperatures and wherein the melting temperature of the fabric is greater than the melting temperature of the member, and wherein the chemical composition impregnating and covering the fabric is a silicone and wherein the member has first and second portions respectively for disposition on the first and second sides of the panel and wherein the fabric is disposed on one of said first and second portions and wherein the first portion of the member has a higher melting temperature than the second portion of the member.

5. A grommet as set forth in claim 4 wherein one of the flaps has a greater length than the other one of the flaps and is bent toward the other one of the flaps and is resilient for engaging and sealing the panel in the socket.

6. A grommet as set forth in claim 5 wherein the fabric is disposed near the surface of the first portion of the member in contoured relationship with the surface of the first portion of the member and in the portion of the member with the central opening and wherein the first portion of the member impregnates and covers the fabric to define the contour of the first portion of the member.

7. A grommet as set forth in claim 6 wherein the first portion impregnating and covering the fabric is a silicone.

8. A grommet as set forth in claim 5 wherein the first and second portions of the member are silicones and wherein the chemical composition of the portion of the member with the one of the flaps has a higher melting temperature than the chemical composition of the portion of the member with the other one of the flaps.

9. A grommet for disposition in a hole in a panel having first and second sides and for reception of a cable, including, a member having inner and outer ends and having an outer periphery at positions on the member, having at its inner end a central opening for receiving the cable in a pressed fit and having at its outer end a pair of flaps defining a socket for receiving the panel and having an outer periphery communicating with the central opening of the member, the member having a chemical composition resisting fire, the member including a fabric made from a material resisting fire, the fabric being impregnated by the member and covered by the member, the fabric having a higher melting temperature than the member, the fabric extending from the outer periphery of the member to the central opening of the member and being disposed near the outer periphery and the central opening of the member, the member having a first portion for being on the first side of the panel and having a second portion for being on the second side of the panel, the chemical composition of the first portion of the member having a greater melting temperature than the melting temperature of the chemical composition of the second portion of the member.

10. A grommet as set forth in claim 9 wherein the melting temperature of the fabric is greater than the melting temperatures of the first and second portions of the member and wherein the fabric has a contour corresponding substantially to the outer periphery of the first portion of the member and the central opening in the member.

11. A grommet as set forth in claim 9 wherein the fabric is a ceramic and the first and second portions of the member are silicones and the ceramic has a higher melting temperature than the melting temperatures of the first and second portions of the member.

12. A grommet as set forth in claim 9 wherein one of the flaps is bent toward the other one of the flaps and the one of the flaps is for resiliently receiving the panel in the socket and sealing the one of the flaps against the socket.

13. A grommet as set forth in claim 9 wherein the melting temperature of the fabric is greater than the melting temperatures of the first and second portions of the member and wherein the fabric is a ceramic and the member is a silicone and wherein one of the flaps is bent toward the other one of the flaps and the one of the flaps is for resiliently receiving the panel in the socket and sealing the one of the flaps against the panel and wherein the fabric has a contour corresponding substantially to the contour of the outer periphery of the first portion of the member and the central opening in the member and wherein the flaps have different lengths and wherein the flap with the longer length is disposed on the same side of the panel as the first portion of the member.

14. A grommet for disposition in a hole in a panel having first and second sides and for reception of a cable, including, fire resistant means formed from a fire resistant material, the fire resistant means providing a pair of flaps defining a socket for receiving the panel in a particular relationship, the fire resistant means having an inner end and having at its inner end a peripheral surface defining a hollow opening for receiving the cable, the fire resistant means having an outer peripheral surface continuous with one of the flaps and with the peripheral surface defining the hollow opening in the fire resistant means, the outer peripheral surface of the fire resistant means having a chemical composition providing a fire resistant surface, and a fabric disposed within the fire resistant means along the peripheral surface at the inner end of the fire resistant means and along the outer peripheral surface of the fire resistant means, the fabric being impregnated and covered by the fire resistant means and having fire resistant properties, wherein the chemical composition of the fire resistant means is a silicone and wherein the chemical composition of the silicone in a first portion of the member is different from the chemical composition of the silicone in a second portion of the member and provides a higher melting temperature for the first portion of the member than for the second portion of the member.

15. A grommet as set forth in claim 14 wherein the fabric is disposed near the periphery of the first portion of the fire resistant means and wherein the fabric has a contour corresponding substantially to the contour of the outer peripheral surface of the first portion of the fire resistant means and to the contour of the peripheral surface of the first portion of the fire resistant means at the inner end of the first portion of the fire resistant means.

16. A grommet as set forth in claim 15 wherein one of the flaps is longer than the other and wherein the fabric is disposed near the periphery of the portion of the fire resistant means on the same side of the member as the longer flap and wherein the fire resistant means is a silicone and the fabric is a ceramic and the fabric has a higher melting temperature than the fire resistant means.

17. A grommet as set forth in claim 14 wherein the inner periphery of the fire resistant means has an annular surface with a radius and with resilient properties providing for flattening the fire resistant means upon the disposition of the cable in the hollow opening.

18. A grommet for disposition in a hole in a panel having first and second sides and for reception of a cable having a radius, including, a member formed from a fire resistant material, the member being shaped to provide a pair of flaps defining a socket for receiving the panel in a particular relationship, the member having an inner end and having at the inner end a peripheral surface defining a hollow opening for receiving the cable, the peripheral surface being annular and having a radius less than the radius of the cable and the member having resilient properties to provide for a flattening of the member upon the disposition of the cable in the hollow opening in the member, the member having a chemical composition to provide a fire resistant surface, and a fabric disposed in the member near the periphery of the member and impregnated and covered with the fire resistant material, the member having first and second portions each communicating with an individual one of the flaps, one of the first and second portions having a higher melting temperature than the other one of the first and second portions.

19. A grommet as set forth in claim 18, including, the chemical composition of the member constituting a silicone.

20. A grommet as set forth in claim 18 wherein the chemical composition on the outer peripheral surface of the member has a Rockwell hardness of substantially fifty-five (55).

21. A grommet as set forth in claim 18 wherein the flaps are for engaging individual ones of the first and second sides of the panel and wherein one of the flaps extends inwardly toward the other one of the flaps in a free disposition of the flaps and wherein the one of the flaps is capable of pivoting in a direction away from the other one of the flaps for engaging the panel in a sealed relationship at an open end of the socket.

22. A grommet as set forth in claim 18 wherein the fabric is made from a ceramic.

23. A grommet as set forth in claim 21 wherein the chemical composition of the member constitutes a silicone with a Rockwell hardness of substantially 55.

24. A grommet as set forth in claim 21 wherein the chemical composition of the member constitutes a silicone and wherein the fabric is disposed in the first portion of the member near the peripheral surface of the first portion of the member and is impregnated and covered with the chemical composition of the member and wherein the fabric is a ceramic having fire resistant properties.

25. A grommet as set forth in claim 24 wherein the fabric and the member have melting temperatures and the melting temperature of the fabric is greater than the melting temperature of the member.

26. A grommet for disposition in a hole in a panel and for reception of a cable having a radius, including, a member having an inner end and having a central opening at its inner end to receive the cable in a pressed fit and having a pair of flaps at its outer end to define a socket for receiving the panel and having a curved configuration at its central opening to provide for a flattening of the member at the central opening against the exterior surface of the cable and having a chemical composition with properties to resist and retard the spread of any fire, a fabric disposed in the member and having a composition to resist any fire and impregnated and covered by the chemical composition of the member, the member having first and second sections each having a melting temperature and the melting temperature of the first section being greater than the melting temperature of the second section.

27. A grommet as set forth in claim 26 wherein the chemical composition of the member is a silicone.

28. A grommet as set forth in claim 27 wherein the cable is annular and wherein the central opening in the member is annular in an axial direction and wherein the fabric is a ceramic.

29. A grommet as set forth in claim 27 wherein one of the flaps has a greater length than the other one of the flaps and is disposed in the first section of the grommet and is bent toward the other one of the flaps and is resilient for engaging and sealing the panel in the socket.

30. A grommet as set forth in claim 26 wherein the fabric is disposed near the surface of the first section and is impregnated and covered by the first section of the member.

31. A grommet as set forth in claim 30 wherein the chemical composition of the member is a silicone.

32. A grommet as set forth in claim 26 wherein the fabric is disposed near the surface of the first section of the member in contoured relationship with the first section of the member and wherein the chemical composition in the first section of the member impregnates and covers the heat resistant fabric to define the contour of the grommet.

33. A grommet as set forth in claim 32 wherein the chemical composition impregnating and covering the heat resistant fabric is a silicone.

* * * * *

UNITED STATES PATENT AND TRADEMARK OFFICE
CERTIFICATE OF CORRECTION

PATENT NO. : 6,051,795
DATED : Apr. 18, 2000
INVENTOR(S) : Bruce S. Fisher, Ronald A. Jackson, Kevin D. Loveall It is certified that error appears in the above-identified patent and that said Letters Patent is hereby corrected as shown below:

Column 3, line 21, change "1-6", to read --1-4--.

Signed and Sealed this

Twentieth Day of March, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

| | | |
|---|---|---|
| PATENT NO. | : 6,051,795 | |
| DATED | : April 18, 2000 | |
| INVENTOR(S) | : Bruce S. Fisher, Ronald A Jackson, Kevin D. Loveall | |

It is certified that error appears in the above-identified patent and that said Letters Patent is hereby corrected as shown below:

<u>Title page:</u>
Showing the illustrative figure should be deleted and substitute therefore the attached title page.

Signed and Sealed this

Seventh Day of August, 2001

*Attest:*

*Attesting Officer*

NICHOLAS P. GODICI
*Acting Director of the United States Patent and Trademark Office*

United States Patent [19]
Fisher et al.

[11] Patent Number: 6,051,795
[45] Date of Patent: Apr. 18, 2000

[54] GIMBALLED GROMMET HAVING SECTIONS WITH DIFFERENT MELT TEMPERATURES

[75] Inventors: Bruce S. Fisher, Burbank; Ronald A. Jackson, Glendora; Kevin D. Loveall, Pasadena, all of Calif.

[73] Assignee: TA Mfg. Company, Glendale, Calif.

[21] Appl. No.: 08/880,023

[22] Filed: Jun. 20, 1997

Related U.S. Application Data

[63] Continuation of application No. 08/518,254, Aug. 22, 1995, abandoned.

[51] Int. Cl.$^7$ ................................................ H01B 17/26
[52] U.S. Cl. .................................... 174/153 G; 16/2.1
[58] Field of Search ........................ 174/153 G, 153 R, 174/152 G, 152 R, 65 G, 151, 157, 65 SS; 16/2.1; 106/18.12, 18.11

[56] References Cited

U.S. PATENT DOCUMENTS

| | | | |
|---|---|---|---|
| 2,039,009 | 4/1936 | Lapman et al. | 285/159 |
| 2,367,836 | 1/1945 | Brown | 16/2 |
| 4,961,989 | 10/1990 | Grimwood | 428/229 |
| 5,071,143 | 12/1991 | Byerly et al. | 277/178 |

*Primary Examiner*—Kristine Kincaid
*Assistant Examiner*—Kamand Cuneo
*Attorney, Agent, or Firm*—Ellsworth R. Roston; Fulwider Patton Lee & Utecht, LLP

[57] ABSTRACT

A grommet disposed in a panel hole to prevent a fire from spreading from one panel side to the other has a pair of flaps defining a socket for nesting in the panel hole in a closely fit relationship. Preferably one flap is longer than the other and is disposed against the panel surface. The grommet has an inner peripheral surface, preferably annular, defining a hollow central opening with a radius less than that of the cable so as to receive and retain the cable even with changes in cable positioning. The grommet has a fire resistant chemical composition which becomes resiliently flattened upon the cable disposition in the grommet opening. One flap is bent toward the other with the panel withdrawn from the socket and is resiliently pressed against the panel with the panel in the socket. The grommet includes, in the section with the larger flap, a fire resistant fabric (e.g. ceramic) impregnated and coated with the fire resistant chemical composition (e.g. silicone with an approximately 55 Rockwell hardness). The chemical composition of the grommet in the section with the larger flap preferably has a higher melting temperature than the chemical composition of the other section.

33 Claims, 2 Drawing Sheets

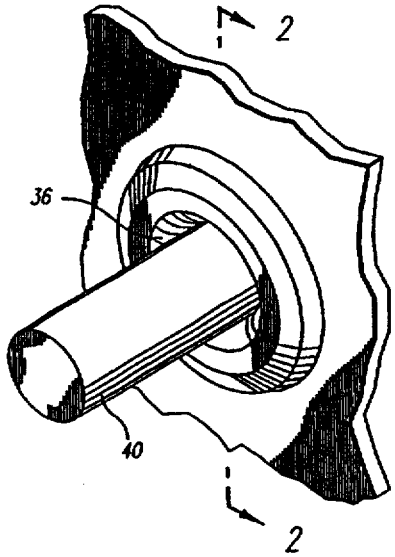

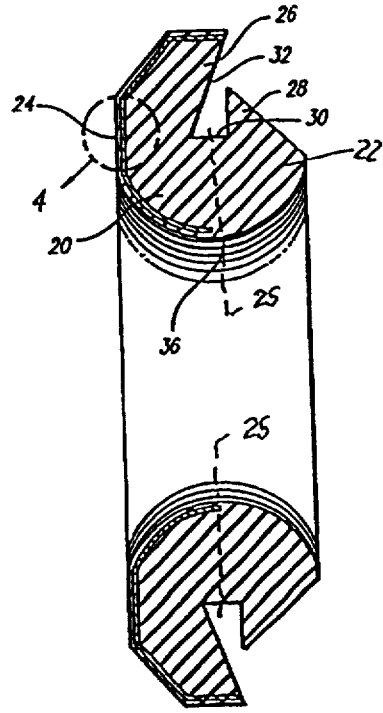

UNITED STATES PATENT AND TRADEMARK OFFICE
CERTIFICATE OF CORRECTION

PATENT NO.   : 6,051,795
DATED        : April 18, 2000
INVENTOR(S)  : Bruce S. Fisher, Ronald A. Jackson, Kevin D. Loveall It is certified that error appears in the above-identified patent and that said Letters Patent is hereby corrected as shown below:

In the Drawings:
Sheet 2 of 2, FIG. 3, add "dash lines" and "25" (two places), and add "22" with leader line as shown.

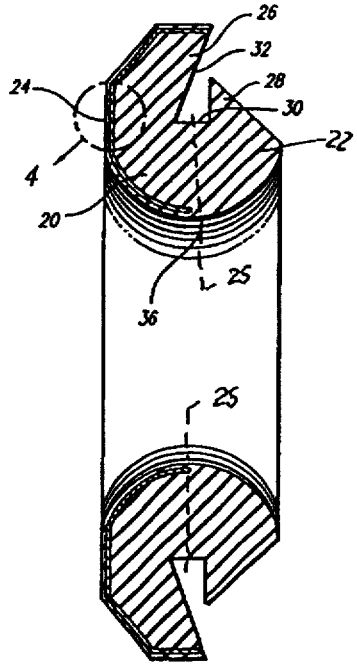

FIG. 3